United States Patent [19]
Yamada et al.

[11] Patent Number: 5,272,667
[45] Date of Patent: Dec. 21, 1993

[54] OPTICAL INFORMATION RECORDING APPARATUS FOR RECORDING OPTICAL INFORMATION IN A PHASE CHANGE TYPE OPTICAL RECORDING MEDIUM AND METHOD THEREFOR

[75] Inventors: Noboru Yamada, Hirakata; Kenichi Nishiuchi, Moriguchi; Eiji Ohno, Hirakata; Nobuo Akahira, Yawata, all of Japan

[73] Assignee: Matsushita Electric Industrial Co., Ltd., Osaka, Japan

[21] Appl. No.: 636,919

[22] Filed: Dec. 31, 1990

[30] Foreign Application Priority Data

Dec. 29, 1989 [JP] Japan .................... 1-340668

[51] Int. Cl.$^5$ .................... G11B 7/00; G11C 13/04
[52] U.S. Cl. .................... 365/113; 365/114; 365/127; 365/215; 365/163; 365/234; 369/13
[58] Field of Search ............ 365/113, 114, 127, 215, 365/163, 234; 369/13

[56] References Cited

FOREIGN PATENT DOCUMENTS 54-834    1/1979   Japan .
56-145530 11/1981  Japan .
59-71140   4/1984   Japan .
62-298035 12/1987  Japan .

OTHER PUBLICATIONS

"High Speed Transformations in Phase-Change Optical Recording Media", Jung et al., Japanese Journal of Applied Physics, vol. 28 (1989), pp. 281-283.

Primary Examiner—Eugene R. LaRoche
Assistant Examiner—Viet Q. Nguyen
Attorney, Agent, or Firm—Wenderoth, Lind & Ponack

[57] ABSTRACT

There is disclosed an optical information recording apparatus for recording optical information in a phase change type optical recording medium and a method therefor. The order of the atomic arrangement of the optical recording medium is capable of changing between a first state of order thereof and a second state of order thereof higher than the first state. A first light source generates a first light including the optical information and projecting the generated first light on the optical recording medium so as to change the order of the atomic arrangement of the optical recording medium from the first state to the second state and from the second state to the first state, mainly by heating the optical recording medium. A second light source generates a second light and projects the generated second light on the optical recording medium together with the first light so as to accelerate the change in the order of the atomic arrangement of the optical recording medium from the first state to the second state caused by the first light source by mainly exciting electrons in the optical recording medium, thereby recording the optical information in the optical recording medium.

24 Claims, 4 Drawing Sheets

OPTICAL INFORMATION RECORDING APPARATUS FOR RECORDING OPTICAL INFORMATION IN A PHASE CHANGE TYPE OPTICAL RECORDING MEDIUM AND METHOD THEREFOR

BACKGROUND OF THE INVENTION

1) Field of the Invention

The present invention relates to an optical information recording apparatus for recording optical information in a phase change type optical recording medium and a method therefor, and more particularly to an optical information recording apparatus for recording optical information in a phase change type optical recording medium using two spots of light generated from light sources such as semiconductor lasers and a method therefor.

2) Description of the Related Art

Conventionally, there have been various kinds of methods for recording an information signal in a phase change type optical recording medium by utilizing a reversible phase change, such as a phase change caused between a crystal state (a crystal phase) and an amorphous state (an amorphous phase), and a phase change caused between a crystal state and another crystal state. In the phase change type optical information recording medium, the crystal state corresponds to a relatively high ordered state of the atomic arrangement thereof, and the amorphous state corresponds to a relatively low ordered state of the atomic arrangement thereof.

The fundamental mechanism of each of these methods is that a change in the construction or the state of the atomic arrangement of the material of the optical recording medium is caused by projecting a light thereon. However, these methods are not classified as a so-called photon mode recording method for recording optical information in an optical recording medium such as a silver salt photographic film, a photochromic recording thin film, by causing a chemical reaction. They are classified as a so-called heat mode recording method for recording optical information in an optical recording medium by converting an absorbed light into heat, resulting in an increase in the temperature of the optical recording medium, and further causing a thermal transformation.

For example, in the case of recording optical information in a recording thin film of an optical recording medium of a chalcogenide glass using a semiconductor laser, the following optical recording method is used.

Namely, as soon as the temperature of a recording portion by projecting a beam of laser light on the recording portion of the recording thin film is increased, the beam of laser light is moved from the recording portion to the other portion thereof, or the light power of the laser light is decreased. At that time, the heat locally caused in the recording portion due to the light absorption diffuses toward the peripheral portions of the recording portion at a high speed, and then the temperature of the recording portion decreases or the recording portion is cooled. Then, the maximum temperature of the recording portion and the cooling speed thereof can be controlled by properly selecting the light power of the laser light and the time of the laser light projection, etc. An information signal can be recorded in the optical recording medium, be reproduced therefrom, and be erased therefrom by utilizing changes of optical characteristics of the optical recording medium caused after cooling the recording portion, such as the reflectance and the transmittance, depending on the above-mentioned condition of the laser light projection.

More concretely, after a recording portion of the recording thin film is melted instantaneously by projecting a beam of laser light thereon, an amorphous state of the recording thin film can be obtained under a rapid cooling condition, and also a crystal state thereof can be obtained under a gradual cooling condition. Further, a crystal state thereof can be obtained by annealing a recording portion thereof without melting an amorphous state of the solid phase thereof.

A method for recording and erasing an information signal by projecting a beam of laser light on the above-mentioned recording medium which rotates or moves on a straight line is classified into the following two methods. One is a method for overwriting an information signal by modulating the light power of a beam of laser light between a recording level, such as an amorphizing level, and an erasing level, such as a crystallizing level. Another is a method for overwriting an information signal by projecting plural beams of laser lights in a manner similar to that of the former method. It is to be noted that the former method is disclosed in the Japanese patent laid-open publication (JP-A) No. 56-145530, and the latter method is disclosed in the Japanese patent laid-open publication (JP-A) No. 59-71140.

The former method has the advantage that the composition of the optical system is extremely simple since there is used only one laser system for projecting a beam of laser light on a recording thin film of an optical recording medium. However, since the time of projecting a beam of laser light on the recording thin film is determined depending on the relative moving speed between a circular spot of laser light whose diameter is as large as about one micron and the optical recording medium, there is the problem that the range of selecting the material of the thin recording film is limited by the recording speed of the optical recording system to be applied. For example, in the case of recording a large amount of data, such as image information in an optical recording medium, it is necessary to set a large relative moving speed between the spot of laser light and the optical recording medium, at about several tens m/sec., resulting in an inevitable decrease in the time of the laser light projection.

In order to solve the above-mentioned problems, it is necessary to provide an optical recording medium of a recording material the crystallization of which can be completed within a relatively short heating time interval, namely, to provide a material having a large crystallizing speed. The shortest crystallizing time of the above-mentioned phase change type optical recording material among those which have been reported up to now is about 50 nsec. It is supposed that when the relative moving speed is heightened, the time of the laser light projection may reach a lower limit of the time required for crystallizing the optical recording medium. Namely, there is the problem that an upper limit of the recording speed is determined depending on the projection method itself.

The latter method includes a fundamental method for projecting a circular spot of laser light having a relatively large power density upon recording an information signal in an optical recording medium or amorphizing the optical recording medium, and for projecting a thin and long spot of laser light having a relatively small power density upon erasing the recorded information signal therefrom or crystallizing the optical recording medium. In this case, for example, there can be used such a condition that the longitudinal length of the spot of laser light for erasing a recorded information signal is set at ten microns and the time of the laser light projection is set at about ten times the time upon recording an information signal in the optical recording medium. Therefore, the latter method has such an advantage that the kind and composition of the recording film of the optical recording medium can be relatively freely selected. However, it is to be noted that the optical system becomes complicated, since it is necessary to form a beam of laser light in the shape of a thin and long spot, and the servo control system becomes complicated since it is necessary to track the thin and long spot of laser light on a track line of the optical recording medium.

In the case of forming a recording mark in the optical recording medium by crystallizing it in order to increase the speed of recording, for example, there is used a preparatory heating beam of laser light prior to a recording beam of laser light so as to previously increase the temperature of the recording beam of laser light so as to previously increase the temperature of the recording portion up to a temperature higher than the room temperature. However, in the case of overwriting an information signal on the optical recording medium, there is the problem that it is difficult to record an information signal therein. Namely, when a portion of the optical recording medium to be recorded is previously heated, a thermal gradient between the center of the recording portion and the peripheral portions thereof becomes small as soon as an information signal is recorded therein. Therefore, the heat caused in the recording portion does not easily diffuse toward the peripheral portions thereof. As a result, there is a problem in that the recording portion of the optical recording medium can not be amorphized under a predetermined rapid cooling condition. Further, there is such a problem that the boundary between an amorphous mark portion and a non-mark portion of the optical recording medium is not distinctly formed, resulting in a decrease in the level of the information signal to be read out from the optical recording medium.

SUMMARY OF THE INVENTION

An essential object of the present invention is to provide an optical information recording apparatus capable of recording optical information in a phase change type optical recording medium at a speed higher than that of the conventional apparatus.

Another object of the present invention is to provide an optical information recording apparatus capable of recording optical information in a phase change type optical recording medium with a carrier to noise ratio higher than that of the conventional apparatus.

A further object of the present invention is to provide a method for recording optical information in a phase change type optical recording medium at a speed higher than that of the conventional method.

A still further object of the present invention is to provide a method for recording optical information in a phase change type optical recording medium with a carrier to noise ratio higher than that of the conventional method.

In order to accomplish the above objects, according to one aspect of the present invention, there is provided an optical information recording apparatus for recording optical information in a phase change type optical recording medium wherein the order of the atomic arrangement of the optical recording medium is capable of changing between a first state of order thereof and a second state of order thereof higher than the first state.

The apparatus comprises a first light source for generating a first light, including the optical information, and projecting the generated first light on the optical recording medium. This changes the order of the atomic arrangement of the optical recording medium from the first state to the second state, and from the second state to the first state, by mainly heating the optical recording medium. A second light source generates a second light and projects the generated second light on the optical recording medium together with the first light projected by the first light source so as to accelerate the change in the order of the atomic arrangement of the optical recording medium from the first state to the second state caused by the first light source by mainly exciting electrons in the optical recording medium, thereby recording the optical information in the optical recording medium.

According to another aspect of the present invention, there is provided an optical information recording apparatus for recording optical information in a phase change type optical recording medium, wherein the order of the atomic arrangement of the optical recording medium is capable of changing between a first state of order thereof and a second state of order thereof higher than the first state. The apparatus comprises a first light source for generating a first light including optical information, and projecting the generated first light on the optical recording medium so as to change the order of the atomic arrangement of the optical recording medium from the first state to the second state, and from the second state to the first state. The first light has a predetermined photon energy and a predetermined light power. A second light source generates a second light and projects the generated second light on the optical recording medium together with the first light projected by the first light source so as to accelerate the change in the order of the atomic arrangement of the optical recording medium from the first state to the second state caused by the first light source. The second light has a predetermined photon energy larger than that of the first light and a predetermined light power smaller than that of the first light, thereby recording the optical information in the optical recording medium.

According to a further aspect of the present invention, the optical information recording apparatus further comprises a first modulator for modulating the first light generated by the first light source according to an information signal corresponding to the optical information.

According to a still further aspect of the present invention, the optical information recording apparatus further comprises a second modulator for modulating the second light generated by the second light source in synchronization with the information signal so that the phases of the first and second lights are opposite to each other.

According to a still further aspect of the present invention, in the optical information recording apparatus, the first modulator modulates the light power changes between a first level, which is a level high enough for instantaneously melting the optical recording medium, and a second level, which is lower than the first level and is low enough for changing the order of the atomic arrangement from the first state to the second state. The second modulator modulates the light power of the second light so that the light power changes between a third level, which is lower than the first level so as not to change the order of the atomic arrangement of the optical recording medium in the case of projecting only the second light on the optical recording medium, and a fourth level lower than the third level.

According to a still further aspect of the present invention, the optical information recording apparatus further comprises an optical device for focusing both the first and second lights on a recording portion of the optical recording medium where the optical information is to be recorded, thereby recording the optical information in the recording portion of the optical recording medium.

According to a further aspect of the present invention, there is provided a method for recording optical information in a phase change type optical recording medium. The order of the atomic arrangement of the optical recording medium is capable of changing between a first state of order thereof and a second state of order thereof higher than the first state. The method includes the steps of generating a first light including the optical information and projecting the generated first light on the optical recording medium so as to change the order of the atomic arrangement of the optical recording medium from the first state to the second state and from the second state to the first state by mainly heating the optical recording medium, and generating a second light and projecting the generated second light on the optical recording medium together with the first light so as to accelerate the change in the order of the atomic arrangement of the optical recording medium from the first state to the second state caused by projecting the generated first light on the optical recording medium by mainly exciting electrons in the optical recording medium, thereby recording the optical information in the optical recording medium.

According to another aspect of the present invention, there is provided a method for recording optical information in a phase change type optical recording medium. The order of the atomic arrangement of the optical recording medium is capable of changing between a first state of order thereof and a second state of order thereof higher than the first state. The method includes the steps of generating a first light including the optical information and projecting the generated first light on the optical recording medium so as to change the order of the atomic arrangement of the optical recording medium from the first state to the second state and from the second state to the first state, the first light having a predetermined photon energy and a predetermined light power, and generating a second light, and projecting the generated second light on the optical recording medium together with the first light so as to accelerate the change in the order of the atomic arrangement of the optical recording medium from the first state to the second state caused by projecting the generated first light on the optical recording medium, the second light having a predetermined photon energy larger than that of the first light and a predetermined light power smaller than that of the first light, thereby recording the optical information in the optical recording medium.

According to another aspect of the present invention, the method further includes a first modulating step of modulating the generated first light according to an information signal corresponding to the optical information.

According to still another aspect of the present invention, the method further includes a second modulating step of modulating the generated second light in synchronization with the information signal so that the phases of the first and second lights are opposite to each other.

According to another aspect of the present invention, in the method the first modulating step includes a step of modulating the light power of the first light so that the light power changes between a first level, which is a level high enough for instantaneously melting the optical recording medium, and a second level, which is lower than the first level, and is low enough for changing the order of the atomic arrangement from the first state to the second state. The second modulating step includes a step of modulating the light power of the second light so that the light power changes between a third level which is lower than the first level so as not to change the order of the atomic arrangement of the optical recording medium in the case of projecting only the second light on the optical recording medium, and a fourth level which is lower than the third level.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
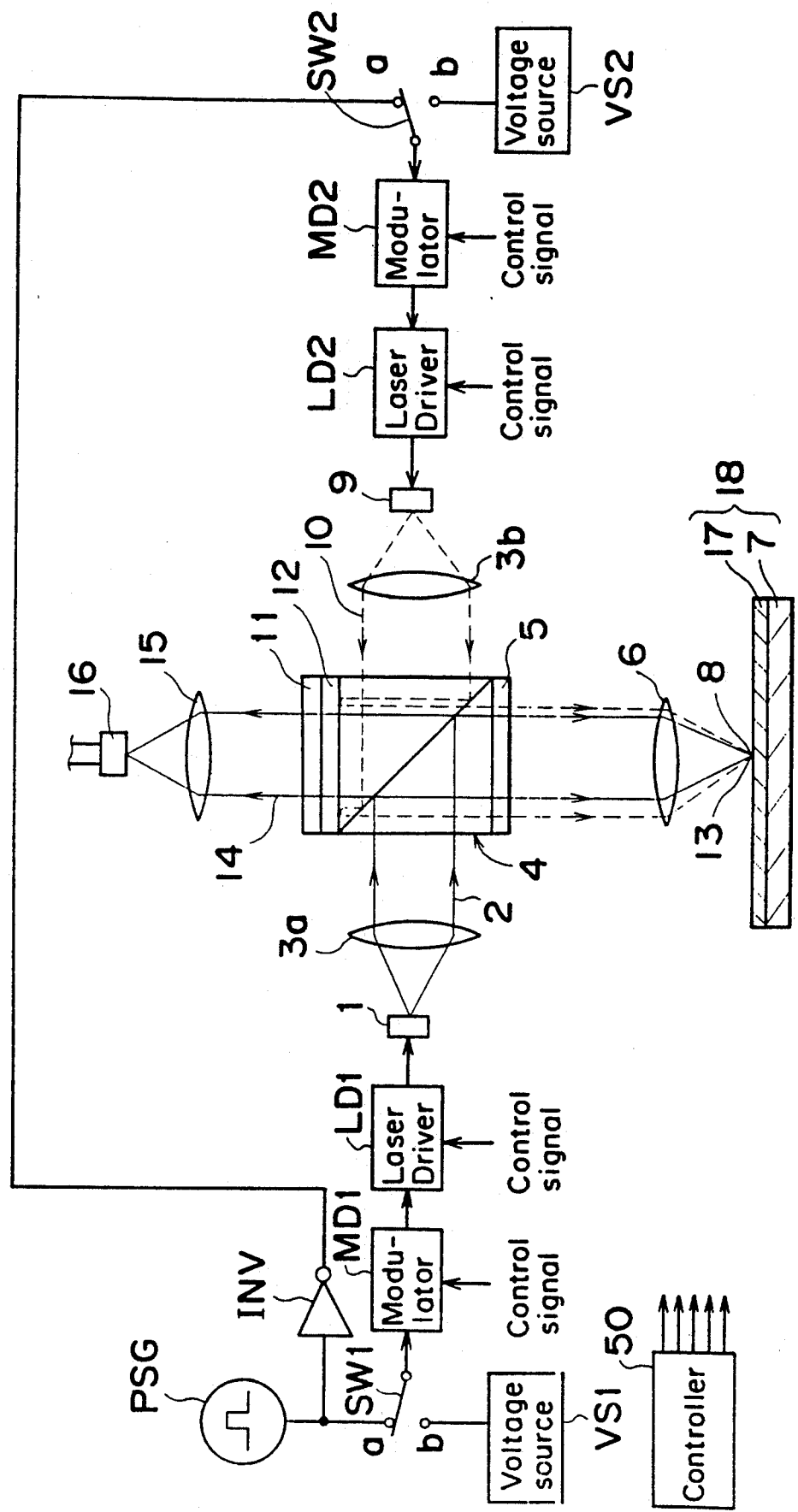
FIG. 1 is a schematic block diagram showing the composition of an experimental system for testing an optical recording and erasing method of a preferred embodiment according to the present invention.

Preferred embodiments according to the present invention will be described below with reference to the attached drawings.

First of all, an optical recording and erasing method of a preferred embodiment according to the present invention will be described below.

It is well known to those skilled in the art that a reversible phase change is caused in a material (referred to as a recording material hereinafter) mainly including a chalcogen such as Te, Se, S or the like by properly selecting the projection condition of a beam of laser light. Namely, after a recording material is heated at a temperature higher than the melting point thereof, the recording material is rapidly cooled from the liquid phase thereof, and then, an amorphous state of the recording material can be obtained. Further, when the recording material in the amorphous state is annealed at a temperature smaller than the melting point, the crystal state of the recording material can be obtained in a predetermined solid phase process. As described above, these processes are classified as processes of the heat mode.

On the other hand, in the case of crystallizing a recording material of a thin film (referred to as a recording thin film hereinafter) such as chalcogenide glass in a predetermined solid phase process by projecting beam of laser light thereon, it has been apparent to those skilled in the art that a phase change due to the above-mentioned photon mode is partially caused in the recording material.

For example, the following mechanism models have been considered. When photons having a relatively large energy such as blue light are absorbed onto the recording thin film, many electrons in a valence band are rapidly and highly excited into a conduction band with the relatively large energy of the photons. In this case, there has been considered such a mechanism model that the recording thin film generates heat when these electrons recombine at a high speed so as to accelerate a change of the construction or the atomic arrangement thereof. Further, with use of a rate constant k in the following Arrhenius' equation, which is often used upon discussing a diffusion speed, etc. of a material:

$$k = A \exp(-Ea/RT) \quad (1)$$

where

A is a frequency factor,
Ea is a free energy of activation,
R is a predetermined constant, and
T is an absolute temperature of the material, there has been considered such a mechanism model that the free energy of activation Ea for the crystallization becomes smaller by a photon energy hv so as to become (Ea−hv), wherein h is the Planck constant and v is a frequency of the light, resulting in a decrease in the energy barrier for the crystallization. However, the above process has not been clearly apparent. Up to now, it has been well known to those skilled in the art that the crystallization is accelerated by the action of the photon mode.

The method for recording and erasing an information signal in an optical recording medium of a preferred embodiment according to the present invention is provided for crystallizing the optical recording medium at a speed higher than the conventional method by using a thermal crystallizing process efficiently together with a light crystallizing process.

FIG. 1 is a schematic block diagram showing the composition of an experimental system for testing the optical recording and erasing method of a preferred embodiment according to the present invention. It is to be noted that the experimental system includes an optical recording and reproducing apparatus of a preferred embodiment according to the present invention.

Referring to FIG. 1, a pulse signal generator PSG generates a pulse signal continuously which changes periodically with a predetermined period or frequency, and outputs it to a pulse amplitude modulator MD1 through a terminal a of a switch SW1, and also outputs the pulse signal to a pulse amplitude modulator MD2 through an inverter INV and a terminal a of a switch SW2. On the other hand, a direct-current voltage source VS1 outputs a predetermined direct-current voltage signal to the pulse amplitude modulator MD1 through a terminal b of the switch SW1. Further, a direct-current voltage source VS2 outputs a predetermined direct-current voltage signal to the pulse amplitude modulator MD2 through a terminal b of the switch SW2.

In response to a high level control signal outputted from a controller 50 for controlling respective devices of the predetermined manner, and outputs the modulated signal through a laser driver LD1 to the light source 1, which generates a first light having a wavelength of 830 nm. On the other hand, in response to a low level control signal outputted from the controller 50, the pulse amplitude modulator MD1 does not modulate the inputted signal, and outputs the inputted signal as it is through the laser driver LD1 to the light source 1. Further, in response to a high level control signal outputted from the controller 50, the laser driver LD1 is turned on. On the other hand, in response to a low level control signal outputted from the controller 50, the laser driver LD1 is turned off.

Furthermore, in response to a high level control signal outputted from the controller 50, the pulse amplitude modulator MD2 modulates the amplitude of the inputted signal in a predetermined manner, and outputs the modulated signal through a laser driver LD2 to a light source 9, which generates a second light having a wavelength of 415 nm. On the other hand, in response to a low level control signal outputted from the controller 50, the pulse amplitude modulator MD2 does not modulate the inputted signal, and outputs the inputted signal as it is through the laser driver LD2 to the light source 9. Further, in response to a high level control signal outputted from the controller 50, the laser driver LD2 is turned on. On the other hand, in response to a low level control signal outputted from the controller 50, the laser driver LD2 is turned off.

It is to be noted that each of the switches SW1 and SW2 is controlled by the controller 50 so as to be switched over between the terminals a and b.

The light source 1 for generating a beam of first light the terminals a and b.

The light source 1 for generating a beam of first light having wavelength of 830 nm comprises a semiconductor laser diode. A beam of first light generated by the light source 1 in response to the signal inputted from the laser driver LD1 is converted into parallel rays of first light 2 by a lens system 3a, and then the parallel rays of first light 2 are reflected by a beam splitter 4 so that the reflected parallel rays of first light 2 are incident on an objective lens 6 through a quarter-wave plate 5. Thereafter, the parallel rays of first light 2 are converged onto a phase change type recording thin film 17 formed on a transparent disc-shaped resin substrate 7 of an optical recording medium 18 so as to form a spot thereon of first light 8 having a half width of about 0.9 $\mu$m in diameter. It is to be noted the optical recording medium 18 comprises the recording thin film 17 and the substrate 7.

Further, the light source 9 for generating a beam of second light having a wavelength of 415 nm comprises a semiconductor laser diode for generating a beam of light having a wavelength of 830 nm and a thin film waveguide type secondary higher harmonic generator, including a crystal of $LiNbO_3$, which are integrally mounted in a case of the light source 9. The beam of second light generated by the light source 9 in response to the signal inputted from the laser driver LD2 is converted into parallel rays of second light 10 by a lens system 3b, and then the parallel rays of second light 10 are reflected by the beam splitter 4 so that the reflected parallel rays of second light 10 are incident on a dichroic mirror 11 through a quarter-wave plate 12. Further, the incident parallel rays of second light 10 are reflected again by the dichroic mirror 11, and then the reflected parallel rays of second light 10 are incident on the objective lens 6 through the quarter-wave plates 12 and 5. Thereafter, the parallel rays of second light 10 are converged on a portion of the phase change type recording thin film 17 located at substantially the same position as that of the spot 8 of the first light 2 so as to form a spot of second light 13 having a diameter which is preferably at least the same as or larger than that of the spot of first light 8.

In the recording thin film 17, a reversible bidirectional phase change is caused between an amorphous state and a crystal state, depending on the predetermined projection conditions of the first and second laser lights. Namely, the recording thin film 17 changes from the amorphous state to the crystal state and from the crystal state to the amorphous state depending on the projection conditions, resulting in a change in the reflectance thereof.

Upon reading out a change of the information signal between the recording portion of the recording thin film 17 and the peripheral non-recording portion thereof in order to read out an information signal recorded in the optical recording medium 18, for example, the light power of the light source 1 is lowered so as to cause no change of state in the recording thin film 17, and a beam of first light 2 generated from the light source 1 is projected onto the recording thin film 17 through the lens system 3a, the beam splitter 4, the quarter-wave plate 5 and the objective lens 6. The light 14 reflected form the surface of the recording thin film 17 (referred to as reflected light hereinafter) is incident, through the objective lens 6, the quarter-wave plate 5, the beam splitter 4, the quarter-wave plate 12, the dichroic mirror 11 and a lens system 15, onto a light detector 16 so that the detector 16 detects the reflected light 14 so as to detect a change of the information signal between the recording portion of the recording thin film 17 and the peripheral non-recording portion thereof.

Further, in the case of reproducing an information signal recorded in the recording thin film 17, there may be detected a change in the amount of light which has passed through the recording thin film 17 toward the side of the substrate 7. In this case, there may be provided a light detector (not shown) for detecting the light passing through the recording thin film 17 and the substrate 7 toward the side of substrate 7.

In the present preferred embodiments, a spot of light or spots of plural lights for recording an information signal in the recording thin film 17, erasing a recorded information signal therefrom, reproducing a recorded information signal therefrom, or overwriting an information signal therein are projected from the side of the recording thin film 17 thereonto. However, the present invention is not limited to this. A spot of light or spots of plural lights may be projected from the side of the substrate 7 therethrough onto the recording thin film 17.

A boundary condition required for causing the crystallization of the recording thin film 17 can be measured by projecting the spots of the first and second lights 8 and 13 on the recording thin film 17 with various kinds of light powers thereof and various kinds of projection times using the above-mentioned experimental system.

Figure 2:
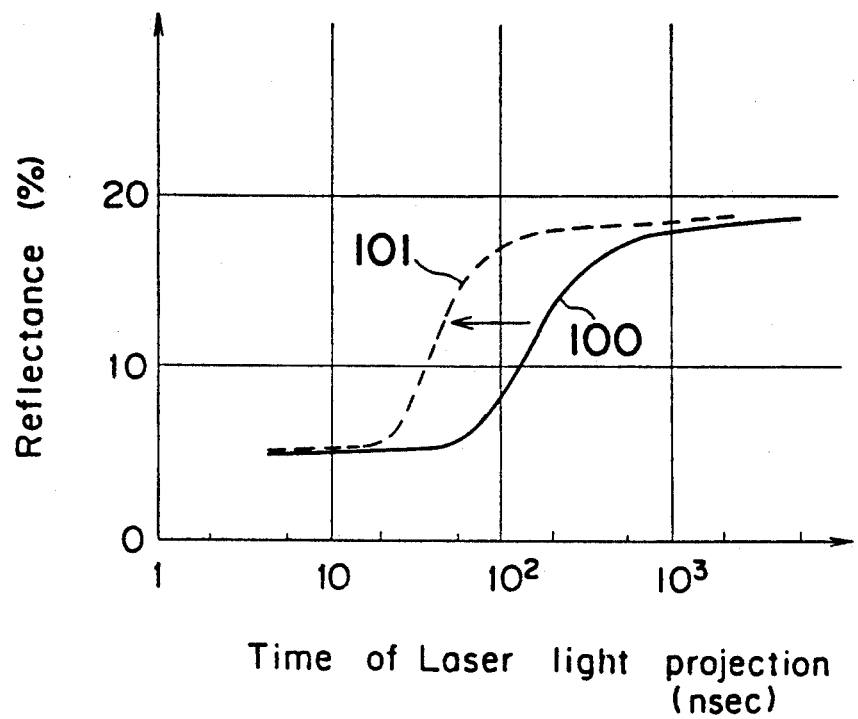
FIG. 2 is a graph of a reflectance characteristic on the time of laser light projection, showing an example where the time of laser light projection required for crystallizing a phase change type recording thin film is reduced by utilizing the optical recording and erasing method of the preferred embodiment according to the present invention.

FIG. 2 is a graph of an experimental result of a reflectance characteristic on the time of laser light projection, showing an example that the time of laser light projection required for crystallizing a phase change type recording thin film 17 is reduced by utilizing the optical recording and erasing method of the preferred embodiment according to the present invention. In this experiment, performed by the present inventors, a recording film 17 of $GeSb_2Te_4$ having a thickness of 100 nm is formed on a disc-shaped substrate 7 of polymethylmethacrylate (PMMA) having a thickness of 1.2 mm, and further, a protection layer (not shown) of $SiO_2$ having a thickness of 200 nm is formed on the recording thin film 17, resulting in the optical recording medium 18.

In FIG. 2, a real line characteristic curve 100 shows the reflectance characteristic of the recording thin film 17 on the time of laser light projection in the case of projecting a spot of first light 8 having a light projection power of 15 mW and a wavelength of 830 nm on the recording thin film 17 (referred to as the first case hereinafter). A dotted line characteristic curve 101 shows the reflectance characteristic thereof on the time of laser light projection in the case of projecting a spot of second light 13 having a light projection power of 0.5 mW and a wavelength of 415 nm together with the above spot of first light 8 on the recording thin film 17 (referred to as the second case hereinafter).

As is apparent from FIG. 2, in the above first case, the time of laser light projection when the reflectance steeply increases or the recording thin film 17 starts in crystallizing (referred to as the crystallizing start time hereinafter) is about 50 nsec. On the other hand, in the above second case, the crystallizing start time is about 20 nsec. In this case, the crystallizing start time is shortened as compared with that of the former case.

Further, even though the light projection power of the spot of first light 8 is heightened by 0.5 mW so as to be set at 20 mW, there is almost no crystallizing start time change. Therefore, it is judged that the change in the crystallizing start time between the above first and second cases may not be caused due to thermal assist, and it may be caused due to an accelerating effect of the above-mentioned photon mode.

It is to be noted that, as the light projection power of the spot of first light 8 is further heightened, a light-projected portion of the recording thin film 17 starts melting before a crystallizing start time of 20 nsec, and there cannot be obtained the accelerating effect similar to that of the above second case.

As the light source 1, there is preferably used a laser capable of generating a coherent light, such as a laser diode, a gas laser, or a solid state laser. As the light source 9, there is preferably used a blue laser comprising the above-mentioned thin film waveguide type secondary higher harmonic generator and a coherent light source comprising a solid state YAG laser and a semiconductor laser, wherein the solid state YAG laser is excited by a beam of light generated by the semiconductor laser so as to obtain the secondary highr harmonic. Further, as the light source 9, there can be used a light source having a coherency smaller than that of the light source 1, such as a light emitting diode (LED) or an incandescent lamp.

When the light energy of the spot of second light 13 is larger than that of the spot of first light 8, there can be obtained a relatively large effect of the photon mode. Therefore, it is necessary to use the light source 9 having a relatively short wavelength, and at least having a wavelength shorter than that of the light source 1.

Figure 3:
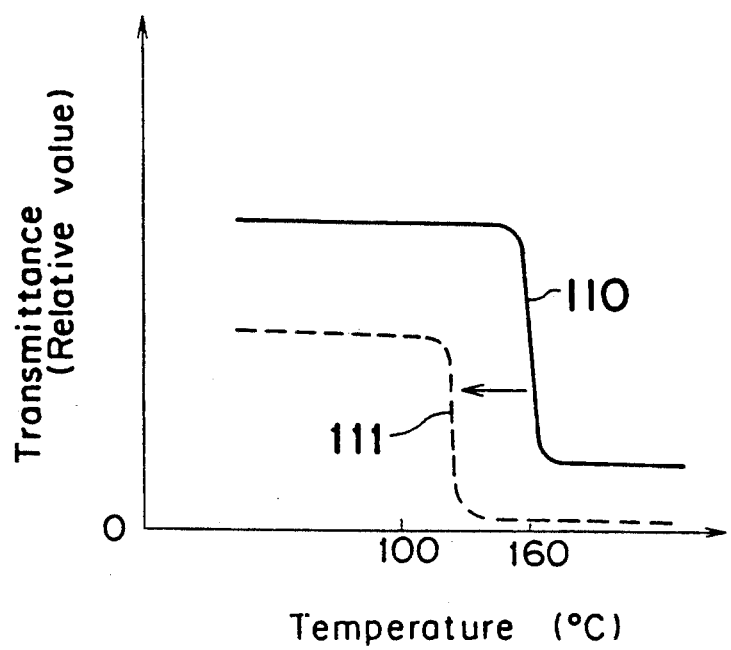
FIG. 3 is a graph of a transmittance (relative value) characteristic on the temperature of the phase change type recording thin film, showing an example where the crystallizing temperature of the recording thin film is lowered when projecting a spot of a second laser light together with a spot of a first laser light.

FIG. 3 is a graph of an experimental result of a transmittance (relative value) characteristic on the temperature of a phase change type recording thin film showing an example where the crystallizing temperature of the recording thin film is lowered when projecting a spot of second laser light together with a spot of first light in the preferred embodiment according to the present invention. to the present invention.

In this experiment, performed by the present inventors, the accelerating effect in the crystallizing process due to the above-mentioned photon mode was measured as a change in the crystallizing transition temperature when heating a phase change type recording thin film at a predetermined constant speed of increasing temperature thereof. Namely, it was measured as a shift of the changing point of the optical transmittance of the recording thin film 17 as follows.

A recording amorphous thin film of GeSb$_2$Te$_4$ having a thickness of 100 nm was formed on a glass substrate having a thickness of 0.3 mm, resulting in a sample. The sample was heated at a speed of increasing temperature of 100° C./min. Simultaneously, the transmittance of the recording amorphous thin film was measured using a spot of laser light.

In FIG. 3, a real line characteristic curve 110 shows the transmittance characteristic on the temperature thereof in the case of measuring the transmittance using a spot of first laser light having a wavelength of 830 nm (referred to as the third case hereinafter). A dotted line characteristic curve 111 shows the transmittance characteristic on the temperature thereof in the case of measuring the transmittance using a spot of second laser light having a wavelength of 415 nm (referred to as the fourth case hereinafter).

As is apparent from FIG. 3, the temperature when the recording thin film starts crystallizing (referred to as the crystallizing transition temperature hereinafter) in the above fourth case was lower that in the above third case. It was understood that the crystallization is accelerated with the assist of the light projection having relatively large photon energy.

These characteristics could be obtained using a recording thin film 17 of a material of (a) a chalcogenide alloy mainly including Te, Se, S, or a system further including O in addition to the above chalcogenide alloy, such as Ge—Te, Ge—Sb—Te, Ge—Sb—Se—Te, Ge—Sn—Te, Ge—Te—Sn—Au, Sb—Te, Sb—Se, Sb—Se—Te, Ge—Bi—Te, Ge—Bi—Se—Te, Bi—Se, Bi—Se—Te, In—Se, In—Se—Tl, In—Se—Tl—Co, In—Se—Te, In—Se—Sb, In—Sb—Te, In—Sb—Se—Te, As—Se, As—S, Ge—P-b—Te—Au—O;

(b) a system obtained by adding an additive to the above system (a);

(c) a stem mainly including Sb, such as In—Sb, Ga—Sb, Ga—In—Sb; or (d) a system obtained by adding an additive to the above system (c).

In particular, the above-mentioned remarkable accelerating effect could be obtained using a recording thin film 17 of a material of one of the following stoichiometric compositions: GeTe, AgSbTe$_2$, Sb$_2$Te$_3$, Bi$_2$Te$_3$, GeBi$_4$Te$_7$, GeBi$_2$Te$_4$, Ge$_3$Bi$_2$Te$_6$, GeTe-Bi$_2$Te$_3$ pseudobinary system, Ge$_2$Sb$_2$Te$_5$, GeSb$_2$Te$_4$, GeSb$_4$Te$_7$, GeTe-Sb$_2$Te$_3$ pseudobinary system, In$_3$SbTe$_2$, Sb$_2$Te$_3$-Sb$_2$Se$_3$ pseudobinary system, and Sb$_2$Te$_3$-Bi$_2$Se$_3$ pseudobinary system, etc.

Further, the present inventors performed the experiments for measuring the above-mentioned crystallizing start time and the above-mentioned crystallizing start temperature with respect to ten recording thin films having typical compositions.

Table 1 shows the results of this experiment. In Table 1, $T_3$ denotes the crystallizing transition temperature in the above third case of projecting only the spot of first light 8 on the recording thin film 17, and $T_4$ denotes the crystallizing transition temperature in the above fourth case of projecting only the spot of second light 13 together with a spot of second time in the above first case of projecting the spot of first light 8 on the recording thin film 17, and $t_2$ denotes the crystallizing start time in the above second case of projecting the spot of second light 13 together with the spot of first light 8 thereon.

As is apparent from Table 1, it is understood that, with respect to each of the recording thin films 17 of all the samples, the crystallizing transition temperature is lowered and the crystallizing start time is reduced by projecting a spot of second light 13 together with a spot of first light 8 thereon. Further, it is understood that each of the stoichiometric compositions of the samples No. 1, 2, 5 and 10 has a large accelerating effect.

Figure 4:
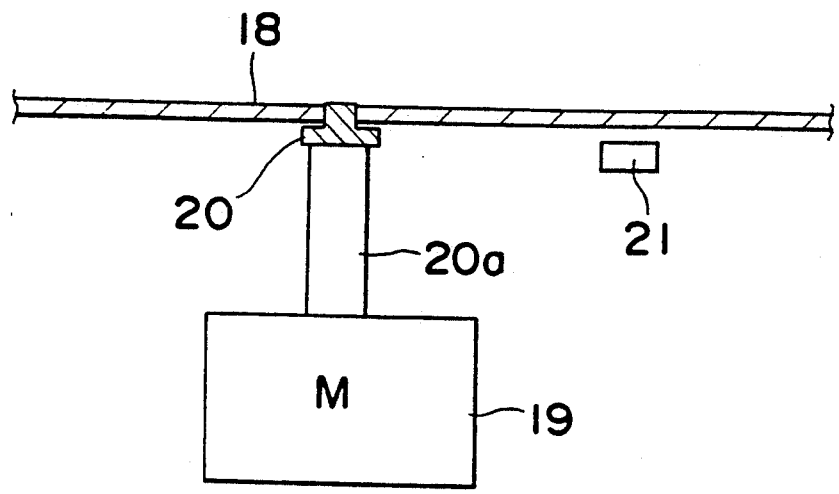
FIG. 4 is a schematic cross sectional view showing an optical recording and reproducing apparatus of a preferred embodiment according to the present invention.

FIG. 4 is a schematic cross sectional view showing an optical recording and reproducing apparatus of a preferred embodiment according to the present invention, to which the optical recording and erasing method is applicable.

Referring to FIG. 4, the optical recording medium 18 is detachably mounted on a turn table 20, which is rotated by a motor 19 through a rotating axis 20a. There is provided an optical recording head 21 under the optical recording medium 18, comprising the optical system including the light sources 1 and 9, the lens systems 3a, 3b, 6 and 15, and the light detector 16, etc., shown in FIG. 1. The optical recording head 21 is mounted on a swinging arm (not shown) so as to access any track on the optical recording medium 18. The light sources 1 and 9 are electrically connected to the pulse signal generator PSG or the direct-current voltage sources VS1 and VS2 as shown in FIG. 1. In the optical recording and reproducing apparatus shown in FIG. 4, a spot of first light 8 can be projected on substantially the same point on the optical recording medium together with a spot of second light 13.

In the experimental system shown in FIG. 1, the pulse signal generator PSG is used. However, in the optical recording and reproducing apparatus for recording an information signal in the optical recording medium 18 and reproducing the recorded information signal therefrom, there is provided a signal generator for generating an information signal instead of the pulse signal generator PSG.

There can be used an optical focusing system for focusing a spot of light on the optical recording medium 18 constituted in a manner similar to that of a conventional optical disc apparatus, which is well known to those skilled in the art. Further, there can be used a tracking system for tracking any track on the optical recording medium 18 constituted in a manner similar to that of a conventional optical disc apparatus, which is well known to those skilled in the art.

Figure 5A:
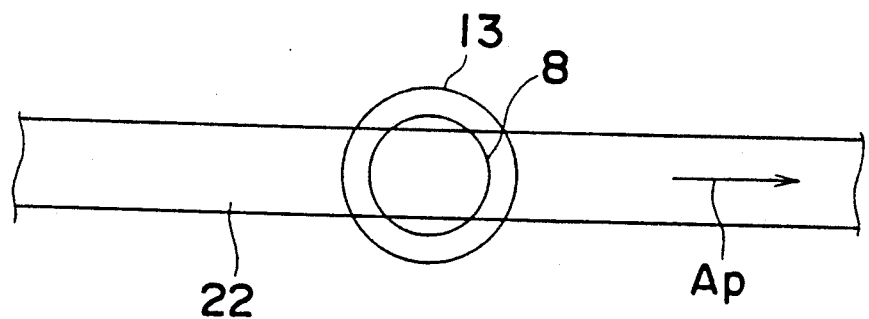
FIG. 5a is a schematic plan view of spots of laser lights on a recording track of the recording thin film when projecting the first and second laser lights thereon.

FIG. 5a is a schematic plan view of spots of laser lights on a recording track 22 of the optical recording medium 18 when projecting spots of first and second lights 8 and 13 thereon. In FIG. 5a, Ap denotes a direction of progress of a recording portion on the recording track of the optical recording medium when continuously recording an information signal in the optical recording medium 18.

In the case of performing a servo-control using the spot of first light 8, the diameter of the spot of second light 13 is set at a value larger than that of the spot of first light 8, and then a position shift of the spot of second light 13, from the spot of first light 8, can be corrected.

Figure 5B:
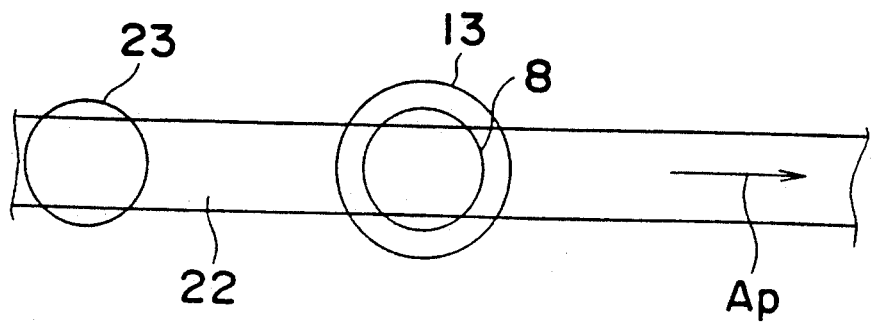
FIG. 5b is a schematic plan view of spots of laser lights on a recording track of the recording thin film when projecting the first to third laser lights thereon.

In the above-mentioned preferred embodiments, spots of first and second lights 8 and 13 are used in order to record an information signal in the optical recording medium 18 and to reproduce the recorded signal therefrom. However, the present invention is not limited to this. As shown in FIG. 5b, a spot of third light 23 may be used in addition to the above-mentioned spots of first and second lights 8 and 13 so as to reproduce a recorded information signal from the optical recording medium 18. In this case, there is used a further light source comprising a semiconductor laser for generating a beam of third light 23, and the further light source is mounted in the above-mentioned optical system of the light sources 1 and 9. Then, the recorded information signal can be confirmed by reproducing the recorded information signal from the optical recording medium 18 using the spot of third light 23 as soon as the information signal is recorded therein.

Figure 6:
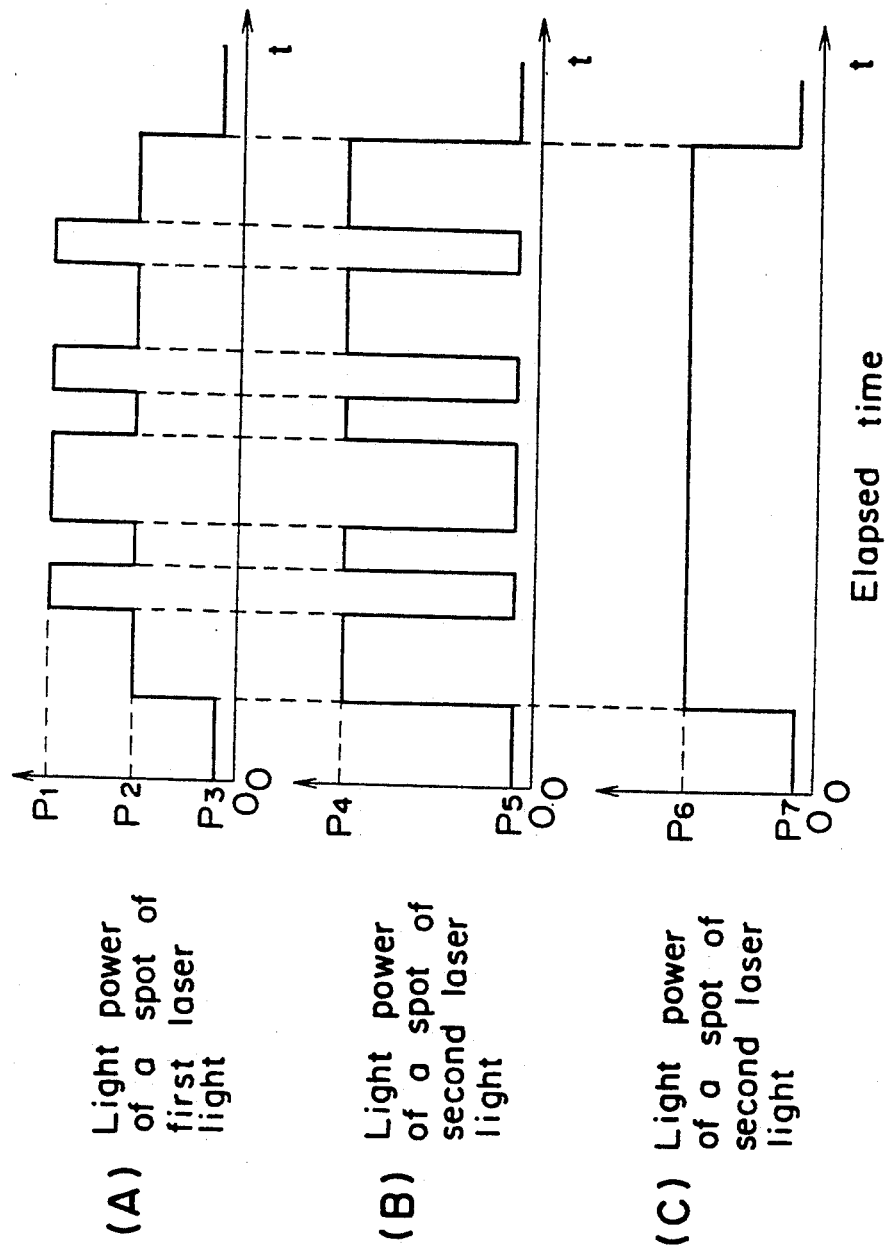
FIG. 6 is a timing chart showing the light power of spots of modulated and non-modulated first and second laser lights.

FIG. 6 is a timing chart showing light powers of spots of modulated or non-modulated first and second laser lights of a preferred embodiment.

(A) of FIG. 6 shows a waveform of the light power of a spot of modulated first light 8 which is used in the optical recording and erasing method of the preferred embodiment according to the present invention, and this waveform is fundamentally similar to a conventional method for overwriting an information signal using a single beam of laser light.

For example, in the case of overwriting an information signal in a phase change type optical recording medium, the state of which changes between an amorphous state and a crystal state, the spot of first light 8 is modulated so that the light power thereof changes between a peak level P1 and a bias level P2, which is smaller than the peak level P1, and projected on the optical recording medium 18. In this case, the peak level P1 is set so that the temperature of a portion of the recording thin film 17 projected on by the spot of first light 8, having a light film 17 projected on by the spot of first light 8, having a light power of the peak level P1, increases up to a temperature higher than the melting point of the recording thin film 17. Also, the bias level P2 is set so that the temperature of the portion of the recording thin film 17 projected on by the spot of first light 8 having a light power of the bias level P2 increases up to a temperature which is lower than the melting point of the recording thin film 17 and is higher than the above-mentioned crystallizing transition temperature of the optical recording thin film 17.

Therefore, independent of the state (the amorphous state or the crystal state) of a recording portion of the recording thin film 17, when the spot of first light 8 having the light power of the peak level P1 is projected on the recording portion of the recording thin film 17, the recording portion thereof becomes amorphous. ON the other hand, independent of the state (the amorphous state or the crystal state) of the recording portion of the recording thin film 17, when the spot of first light 8 having the light power of the bias level P2 is projected on the recording portion of the recording thin film 17, the recording portion thereof becomes crystal.

(B) of FIG. 6 shows a waveform of the light power of the spot of modulated second light 13 corresponding to the waveform of the light power of the spot of modulated first light 8, showing a first modulation method for modulating the spot of second light 13 in synchronization with the spot of first light 8 so that the phases of the first and second lights 8 and 13 become opposite to each other. In the first modulation method, when the light power of the spot of first light 8 is the peak level P1, the spot of second light 13 having a light power of a relatively low level P5 is projected on the recording thin film 17. On the other hand, when the light power of the spot of first light 8 is the bias level P2, the spot of second light 13 having a light power of a relatively high level P4, higher than the above level P5, is projected on the recording thin film 17.

(C) of FIG. 6 shows a waveform of the light power of the spot of non-modulated second light 13 corresponding to the waveform of the light power of the spot of modulated first light 8 showing a second modulation method for not modulating the spot of second light 13. In the second modulation method, when the light power of the spot of first light 8 is equal to or larger than a predetermined base level P3 smaller than the bias level P2, the spot of non-modulated second light 13 having a light power of a predetermined constant level P6 larger than a predetermined base level P7 is projected on the recording thin film 17. The spot of second light 13 is provided for exciting a portion of the recording thin film 17, mainly due to the photon mode, or for mainly exciting electrons in the recording thin film 17, so that the portion easily crystallizes. Further, since the spot of second light 13 having a light power extremely smaller than that of the spot of first light 8 is projected on a portion of the recording thin film 17, the portion thereof does not reach the crystallizing transition temperature, namely it does not thermally crystallize.

As described above, when the spot of first light 8 is projected on the recording thin film 17 together with the spot of second light 13, it is observed that the phase change due to the spot of first light 8 is accelerated by the spot of second light 13.

According to our experiments, a carrier to noise ratio measured in the above-mentioned first modulation method is slightly larger than that measured in the above-mentioned second the spot of second light 13 crystallizes a portion when the spot of first light 8 having a light power of the relatively high peak level P1 is projected on the portion together with the spot of second light 13, however, the details thereof are not apparent to the present inventors.

Experimental examples 1 to 4 of the preferred embodiments will be described below.

EXAMPLE 1

A mixture thin film of $ZnS-SiO_2$ having a thickness of 140 nm and a content of $SiO_2$ of 20 mole %, an optical recording thin film of $Ge_2Sb_2Te_5$ having a thickness of 20 nm, a mixture thin film of $ZnS-SiO_2$ having a thickness of 25 nm and a thin film of Al having a thickness of 100 nm were sequentially formed in a laminated structure by the sputtering method under a pressure of an Ar gas of 0.5 Pa, wherein Pa was the pressure of the atmosphere, on a disc-shaped polycarbonate substrate having a thickness of 1.2 mm and a size of 130 mm in diameter, on the surface of which a spiral groove for guiding a spot of light was formed, resulting in a recording disc. After two recording discs were made, the two recording discs were bonded with an adhesive on to each other so that optical recording thin films oppose each other, resulting in an optical recording disc.

The mixture thin film of $ZnS-SiO_2$ was provided for diffusing the heat caused in the recording thin film, and this mixture thin film can be substituted by:

(a) an oxide such as $SiO_2$, $TiO_2$, $Al_2O_3$, ZnO,
(b) a sulfide such as TiN, ZrN, BN, SiN, AlN,
(c) a carbide such as SiC,
(d) a fluoride such as $CaF_2$,
(e) a selenide such as ZnSe, or
(f) a mixture of a combination of these compositions.

The thin film of Al was provided for heightening the optical absorption efficiency of the recording thin film, and this thin film may be made of a metal, such as Au, Cu, Ti, Al-Cr, Al-Ti, Ni-Cr, Au-Cr. It is to be noted that the above recording thin film was made in this case in an amorphous state.

The optical recording disc was mounted as the optical recording medium 18 on the turn table 20 shown in FIG. 4, and the following experiment was performed using the experimental system shown in FIG. 1 by the present inventors.

First of all, in a first experiment of example 1, the switch SW1 was switched over to the terminal b. thereof, the low control signal was inputted to the pulse amplitude modulator MD1 so as not to modulate the spot of first light 8, the laser driver LD1 was turned on, and the laser driver LD2 was turned off. Then, only a spot of first light 8 having a half-width of 0.9 μm in a diameter and a constant light power of 12 mW on the optical recording disc, which was not modulated, was projected onto the optical recording disc, and then a change in the intensity of the light reflected from the optical recording disc was measured. As the rotational frequency of the motor 19 was gradually heightened so as to heighten the linear velocity, there was no change in the intensity of the reflected light when the linear velocity became equal to or larger than 30 m/sec., corresponding to a time of laser light projection of 30 nsec. According to this experiment, it was found out that the recording thin film did not easily crystallize at a linear velocity equal to or larger than 30 m/sec.

Thereafter, in the second experiment of example 1, the switch SW2 was switched over to the terminal b, the low control signal was inputted to the pulse amplitude modulator MD2 so as not to modulate the spot of second light 13, and the laser driver not to modulate the spot of second light 13, and the laser driver LD2 was turned on. Then, the spot of second light 13 having a half-width of 1 μm and a constant light power of 1 mW on the optical recording disc was projected on the optical recording disc together with the above-mentioned spot of first light 8, and then a change in the intensity of the reflected light was measured in a manner similar to that of the above-mentioned first experiment. Even in the case of a linear velocity of 45 m/sec., corresponding to a time of laser light projection of 20 nsec., an increase in the intensity of the reflected light was measured, and it was observed that the recording thin film crystallized.

Further, the above-mentioned second experiment was performed after setting the light power of the spot of first light 8 at 21 mW. Any change in the intensity of the reflected light was not measured in the case of a linear velocity equal to or higher than 30 m/sec.

Thereafter, in a third experiment of example 1, an experiment for projecting the spot of first light 8 on a crystallized portion of the recording thin film, which was a portion thereof where the intensity of the reflected light increases, together with and without a spot of second light 13 was performed in a manner similar to the above-mentioned first and second experiments, after setting the light power of the spot of first light 8 at 25 mW. In this case, independent of projecting the spot of second light 13 thereon, it was observed that the intensity of the reflected light decreased until the linear velocity became 45 m/sec, namely, the portion of the recording thin film became amorphous.

Table 2 shows the measured absorptances of the recording thin film of $Ge_2Sb_2Te_5$ and the measured reflectances of the optical recording disc which were used in the example 1, for two wavelength of 830 nm and 415 nm.

As is apparent from Table 2, a relatively large absorptance of the recording thin film can be obtained independent of the state thereof (the crystal state or the amorphous state). Further, a relatively large change in the intensity of the reflected light can be obtained. It was confirmed that the optical recording disc which was made in the above-mentioned manner had an optimum optical recording and erasing characteristic.

In the present preferred embodiments, the recording thin film is preferably made of a composition having an absorptance which is large enough to substantially absorb each of the spots of first and second lights 8 and 13.

Further, the recording thin film is preferably made of a composition having a change in the reflectance caused by the change of the state of the recording thin film of each of the spots of first and second lights 8 and 13 which is large enough to substantially detect the change in the reflectance with the optical detector 16.

EXAMPLE 2

In example 2 there was used the optical recording disc made in the example 1, and the experimental system shown in FIG. 1. In this case, the switch SW1 was switched over to the terminal a thereof, and the switch SW2 was switched over to the terminal b thereof. The high level control signal was inputted ot the pulse amplitude modulator MD1, and then a spot of first light 3 was modulated with a modulation frequency of 5 MHz so that the light power of the pot of first light 8 changed between a peak level of 12 mW, which was predetermined for crystallizing the recording thin film, and a bias level of 1 mW, which is predetermined for reproducing an information signal recorded in the optical recording disc. The low control signal was inputted to the pulse amplitude modulator MD2 so as not to modulate the spot of second light 13 having a constant light power of 1 mW, which was continuously generated. Under a linear velocity of 45 m/sec., the spot of first light 8 was projected on the optical recording disc together with the spot of second light 13, resulting in crystallization of a portion of the recording thin film so as to record an information signal therein. After recording the information signal therein, the recorded information signal was reproduced using a spot of first light 8 having a light power of 1 mW. In this experiment, a carrier to noise ratio of 50 dB was measured using a spectrum analyzer.

EXAMPLE 3

In a first experiment of example 3, there was used the optical recording disc made in example 1, and the experimental system shown in FIG. 1. In this case, the switch SW1 was switched over to the terminal a thereof, and the switch SW2 was switched over to the terminal b thereof. The high level control signal was inputted to the pulse amplitude modulator MD1, and then a spot of first light 8 was modulated with a modulation frequency of 5 MHz, as shown in (A) of FIG. 6, so that the light power of the spot of first light 8 changed between a peak level P1 of 25 mW and a bias level P2 of 12 mW. The low control signal was inputted to the pulse amplitude modulator MD2 so as not to modulate the spot of second light 13 having a constant light power of 1 mW, which was continuously generated. Under a linear velocity of 45 m/sec., the spot of first light 8 was projected on the optical recording disc together with the spot of second light 13 so as to record an information signal therein. After recording the information signal therein, the recorded information signal was reproduced using a spot of first light 8 having a light power of 1 mW. In this experiment, a carrier to noise ratio of 50 dB was measured using a spectrum analyzer.

Thereafter, an information signal was overwritten in a recorded track with a modulation frequency of 2 MHz in a manner similar to that of the first experiment of example 3. In this case, a carrier to noise ratio of 50 dB was measured for a frequency component of 2 MHz, and a frequency component of 5 MHz was attenuated by 35 dB, resulting in overwriting an information signal therein.

Thereafter, in a second experiment of example 3, each of the switches SW1 and SW2 was switched over to the terminal a thereof. The high level control signal was inputted to the pulse amplitude modulators MD1 and MD2, and then spots of first and second light 8 and 13 were modulated with a modulation frequency of 5 MHz as shown in (A) and (B) of FIG. 6 so that the light power of the spot of first light 8 changed between a peak level P1 of 25 mW and a level P2 of 12 mW, and the light power of the spot of second light 13 changed between a level P5 of 0 mW and a peak level P4 of 1 mW, respectively. The phase of the spot of first light 8 was opposite to that of the spot of second light 13, since the inverter INV inverted the pulse signal outputted from the pulse signal generator PSG, as shown in FIG. 1. Under a linear velocity of 45 m/sec., the spot of first light 8 was projected on the optical recording disc together with the spot of second light 13 so as to record an information signal therein. After recording the information signal therein, the recorded information signal was reproduced using a spot of first light 8 having a light power of 1 mW. In this experiment, a carrier to nose ratio of 52 dB was measured using the spectrum analyzer.

Thereafter, an information signal was overwritten in a recorded track of the recording thin film with a modulation frequency of 2 MHz in a manner similar to that of the second experiment of example 3. In this case, a carrier to noise ratio of 52 dB was measured for a frequency component of 2 MHz, and a frequency component of 5 MHz was attenuated by 37 dB, resulting in overwriting an information signal therein.

Further, the recorded information signal was reproduced using a spot of second light 13 having a light power of 1 mW. In this case, substantially the same carrier to noise ratio and signal attenuation as those of the former case could be obtained.

EXAMPLE 4

In example 4, an experiment was performed using a blue light emitting diode having a light source of 3 mW as the light source 9 in a manner similar to that of the above-mentioned first experiment of example 3. In this case, a spot of first light 8 was modulated with a modulation frequency of 5 MHz so that the light power thereof changed between a peak level P1 of 25 mW and a bias level P2 of 12 mW. The spot of first light 8 was projected onto the optical recording disc together with a spot of second light 13 having a diameter of 100 μm generated by the light emitting diode under a linear velocity of 45 m/sec. However, the recording thin film of the optical recording disc did not crystallize.

Further, the linear velocity was gradually lowered, and then, the above-mentioned experiment was performed repeatedly. Under a linear velocity of 35 m/sec., an information signal could be overwritten in the recording thin film of the optical recording disc, and the present inventors confirmed the above-mentioned accelerating effect due to projection of the spot of second light 13 generated by the light emitting diode.

EXAMPLE 5

In example 5, optical recording discs comprising recording thin films of various kinds of compositions were prepared, each optical recording disc having a single plate structure, as follows.

A thin film of a dielectric material having an optical thickness of about $\lambda/(4n)$ wherein $\lambda$ is a wavelength of a spot of light and n is a refractive index thereof, an optical recording thin film having a thickness of 40 nm, a thin film of the dielectric material having an optical thickness of about $\lambda/(2n)$ and a reflection thin film of a metal having a thickness of 50 nm were sequentially formed in a laminated structure by the sputtering method under a pressure of an Ar gas of 0.5 Pa, wherein Pa was the pressure of the atmosphere, on a disc-shaped polycarbonate substrate having a thickness of 1.2 mm, on the surface of which a spiral groove for guiding a spot of light is formed. Thereafter, an ultraviolet-rays hardening resin layer having a thickness of about 10 μm was coated thereon by the spin coating method, and then an ultraviolet light was illuminated thereonto by a lamp so as to make the ultraviolet-rays hardening resin layer harden, resulting in a further optical recording disc. As a whole, there were made four further optical recording discs comprising recording thin films of various kinds of compositions.

The state of the recording thin film of each of the prepared optical recording discs was previously changed to a crystal state by projecting a beam of laser light, using an apparatus utilizing an Ar gas which is disclosed in the Japanese patent examined publication (JP-B2) No. 2-45247/1990.

Further, an experiment for overwriting an information signal in the optical recording discs was performed in a manner similar to that of the first experiment of example 3. The optical recording disc was rotated in a predetermined constant rotational speed. The spot of first light 8 was modulated, with modulation frequencies of a frequency corresponding to the case where the longitudinal length of the recorded mark was 0.9 μm and of a frequency corresponding to the case where the longitudinal length of the recorded mark was 2.4 μm so that the light power changed between a peak level P1 and a bias level of P2. In this case, the above-mentioned modulation frequencies correspond to 16.6 MHz and 6.2 MHz, respectively, under a linear velocity of 30 m/sec. Then, an information signal was recorded in each of the optical recording discs, alternately with the above-mentioned modulation frequencies. In this experiment, the peak level P1 and the bias level P2 were set so that there was obtained a carrier to noise ratio of 45 dB and a signal attenuation of 20 dB.

Table 3 shows the compositions of the dielectric thin films, the recording thin films and the reflection thin films, and the results of this experiment.

In Table 3, each of the optical recording discs of samples 1 and 2 comprises a recording thin film of a stoichiometric composition, and each of the optical recording discs of samples 3 and 4 comprises a recording thin film of a non-stoichiometric composition. $V_1$ is the maximum linear velocity when an information signal can be overwritten therein in the case of projecting only a spot of first light 13 on the optical recording disc, and $V_2$ is the maximum linear velocity when an information signal can be overwritten therein in the case of projecting a spot of first light 8 on the optical recording disc together with a spot of second light 13.

As is apparent from Table 3, with respect to each of the optical recording discs of all the samples, it is understood that the maximum linear velocity increases due to an assist of a spot of second light 13. Particularly with respect to each of the optical recording discs of samples 1 and 2, the increase in the maximum linear velocity is relatively large.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

TABLE 1

| No. | COMPOSITION | $T_3$(°C.) | $T_4$(°C.) | $t_1$(nsec) | $t_2$(nsec) |
|---|---|---|---|---|---|
| 1 | $Ge_{50}Te_{50}$ (GeTe) | 190 | 160 | 50 | 30 |
| 2 | $Ge_{22}Sb_{22}Te_{56}$ ($Ge_2Sb_2Te_5$) | 180 | 140 | 50 | 20 |
| 3 | $Ge_{19}Sb_{25}Te_{56}$ | 170 | 130 | 50 | 20 |
| 4 | $Ge_{22}Sb_{24}Te_{54}$ | 200 | 170 | 100 | 70 |
| 5 | $Sb_{40}Te_{60}$ ($Sb_2Te_3$) | 100 | 80 | 50 | 30 |
| 6 | $Te_{80}Ge_5Sn_{15}$ | 140 | 130 | 10,000 | 8,000 |
| 7 | $Te_{60}Ge_4Sn_{11}Au_{25}$ | 125 | 110 | 300 | 250 |
| 8 | $Te_{60}Ge_5Sn_{15}O_{20}$ | 130 | 125 | 1,000 | 900 |
| 9 | $Ge_{20}Te_{46}Sb_{24}Se_{10}$ | 200 | 170 | 200 | 150 |
| 10 | $Ag_{25}Sb_{25}Te_{50}$ ($AgSbTe_2$) | 110 | 80 | 50 | 20 |

TABLE 2

| Wavelength | Absorptance of recording film | | Reflectance of recording disc | |
|---|---|---|---|---|
| | Amorphous | Crystal | Amorphous | Crystal |
| 830 nm | 83% | 68% | 2% | 28% |
| 415 nm | 93% | 78% | 4% | 19% |

TABLE 3

| No. | Dielectric film | Recording film | Reflection film | $V_1$ (m/sec) | $V_2$ (m/sec) |
|---|---|---|---|---|---|
| 1 | $ZnS-SiO_2$ | $Ge_2Sb_2Te_5$ | Al | 30 | 50 |
| 2 | SiNO | GeTe | Au | 28 | 45 |
| 3 | ZnS | $Te_{60}Ge_4Sn_{11}Au_{25}$ | Au | 3 | 4 |
| 4 | $GeO_2$ | $Te_{80}Ge_5Sn_{15}$ | NiCr | 0.1 | 0.12 |

What is claimed is:

1. An optical information recording apparatus for recording optical information in an optical recording medium having a recording thin film capable of changing between amorphous and crystalline states, said apparatus comprising:

a first light source means for generating a first light incorporating the optical information and projecting said first light on the optical recording medium so as to change the state of the recording thin film from one of the crystalline state and the amorphous state to the other of the crystalline state and the amorphous state mainly by heating the optical recording medium;

second light source means for generating a second light having a wavelength smaller than that of said first light and simultaneously projecting said generated second light together with said first light projected by said first light source means on the same portion of the optical recording medium so as to accelerate the change in state from the amorphous state to the crystalline state caused by said first light source means by exciting electrons in the optical recording medium, thereby recording the optical information in the optical recording medium;

first modulating means for modulating said first light generated by said first light source means so that the light power of said first light changes between a first level, which is a high level high enough for instantaneously melting the recording thin film, and a second level lower than said first level which is sufficient for changing the state of the recording thin film from the amorphous state to the crystalline state; and optical means for focusing both said first and second lights on a recording portion of the optical recording medium where the optical information is to be recorded, thereby recording the optical information in the recording portion of optical recording medium.

2. The apparatus as claimed in claim 1, wherein each of said first and second lights is a coherent light.

3. The apparatus as claimed in claim 1, and further comprising second modulating means for modulating said second light generated by said second light source means in synchronization with said first light so that the modulation phases of said first and second lights are opposite to each other.

4. The apparatus as claimed in claim 3, wherein said second modulating means modulates the light power of said second light so that the light power of said second light changes between a third level lower than said first level and a fourth level lower than said third level, each of said third level and said fourth level being a low level of power which cannot change the state of the recording thin film from the amorphous state to the crystalline state without projecting said first light onto the recording thin film.

5. The apparatus as claimed in claim 1, wherein said first light is a coherent light, and said second light is a non-coherent light.

6. The apparatus as claimed in claim 1, wherein each of said first and second light source means comprises a semiconductor laser.

7. The apparatus as claimed in claim 1, wherein:
said first light source means comprises a semiconductor laser; and
said second light source means comprises a semiconductor laser for generating a light having a predetermined wavelength and a higher harmonic generator for generating a higher harmonic component of said light generated by said semiconductor laser of said second light source means.

8. The apparatus as claimed in claim 1, wherein said first light source means comprises a semiconductor laser, and
said second light source means comprises a light emitting diode.

9. The apparatus as claimed in claim 1, wherein said optical recording medium is made of a chalcogenide.

10. An optical information recording apparatus for recording optical information in an optical recording medium having a recording thin film capable of changing between amorphous and crystalline states, said apparatus comprising:
a first light source means for generating a first light incorporating the optical information and projecting said first light on the optical recording medium so as to change the state of the recording thin film from one of the crystalline state and the amorphous state to the other of crystalline state and the amorphous state, said first light having a predetermined photon energy and a predetermined light power;
second light source means for generating a second light having a wavelength smaller than that of said first light and simultaneously projecting said generated second light together with said first light projected by said first light source means on the same portion of the optical recording medium so as to accelerate the change in state from the amorphous state to the crystalline state caused by said first light source means, said second light having a predetermined photon energy larger than that of said first light and a predetermined light power smaller than that of said first light, thereby recording said optical information in said optical recording medium;
first modulating means for modulating said first light generated by said first light source means so that the light power of said first light changes between a first level, which is a high level high enough for instantaneously melting the optical recording medium, and a second level lower than said first level which is sufficient for changing the state of the recording thin film from the amorphous state to the crystalline state; and
optical means for focusing both said first and second lights on a recording portion of the optical recording medium where the optical information is to be recorded, thereby recording the optical information in the recording portion of the optical recording medium.

11. The apparatus as claimed in claim 10, and further comprising second modulating means for modulating said second light generated by said second light source means in synchronization with said first light so that the modulation phases of said first and second lights are opposite to each other.

12. The apparatus as claimed in claim 11, wherein said second modulating means modulates the light power of said second light so that the light power of said second light changes between a third level lower than said first level and a fourth level lower than said third level, each of said third level and said fourth level being a low level of power which cannot change the state of the recording thin film from the amorphous state to the crystalline state without projecting said first light onto the optical recording medium.

13. The apparatus as claimed in claim 10, wherein each of said first and second lights is a coherent light.

14. The apparatus as claimed in claim 10, wherein said first light is a coherent light, and said second light is a non-coherent light.

15. The apparatus as claimed in claim 10, wherein each of said first and second light source means comprises a semiconductor laser.

16. The apparatus as claimed in claim 10, wherein:
said first light source means comprises a semiconductor laser; and
said second light source means comprises a semiconductor laser for generating a light having a predetermined wavelength and a higher harmonic generator for generating a higher harmonic component of said light generated by said semiconductor laser of said second light source.

17. The apparatus as claimed in claim 10, wherein said first light source means comprises a semiconductor laser, and
said second light source means comprises a light emitting diode.

18. The apparatus as claimed in claim 10, wherein said optical recording medium is made of a chalcogenide.

19. A method of recording optical information in an optical recording medium having a recording thin film capable of changing between amorphous and crystalline states, said method including the steps of:

generating a first light incorporating the optical information and projecting said generated first light on said optical recording medium so as to change the state of said recording thin film from the amorphous state to the crystalline state mainly by heating said optical recording medium;

generating a second light and simultaneously projecting said generated second light together with said first light on the same portion of said optical recording medium so as to accelerate the change in state of said optical recording medium from the amorphous state to the crystalline state caused by projecting said first light on said optical recording medium by exciting electrons in said optical recording medium, thereby recording said optical information in said optical recording medium; and a first modulating step of modulating said generated first light so that the light power of said first light changes between a first level, which is a high level high enough for instantaneously melting said optical recording medium, and a second level lower than said first level which is sufficient for changing the state of said recording thin film from the amorphous state to the crystalline state.

20. The method as claimed in claim 19, and further including a second modulating step of modulating said generated second light in synchronization with said first light so that the modulation phases of said first and second lights are opposite to each other.

21. The method as claimed in claim 20, wherein said second modulating step includes modulating the light power of said second light so that the light power of said second light changes between a third level lower than said first level and a fourth level lower than said third level, each of said third level and said fourth level being a low level of power which cannot change the state of said recording thin film from the amorphous state to the crystalline state without projecting said first light onto said optical recording medium.

22. A method of recording optical information in an optical recording medium having a recording thin film capable of changing between amorphous and crystalline states, said method including the steps of:

generating a first light including said optical information and projecting said first light on said optical recording medium so as to change the state of said recording thin film from the amorphous state to the crystalline state, said first light having a predetermined photon energy and a predetermined light power;

generating a second light and simultaneously projecting said second light together with said first light on the same portion of said optical recording medium so as to accelerate the change in the state of said optical recording medium from the amorphous state to the crystalline state caused by projecting said generated first light on said optical recording medium, said second light having a predetermined photon energy larger than that of said first light and a predetermined light power smaller than that of said first light, thereby recording said optical information in said optical recording medium; and a first modulating step of modulating said generated first light so that the light power of said first light changes between a first level, which is a high level high enough for instantaneously melting said optical recording medium, and a second level lower than said first level which is sufficient for changing the state of said recording thin film form the amorphous state to the crystalline state.

23. The method as claimed in claim 22, further including a second modulating step of modulating said second light in synchronization with said first light so that the modulation phases of said first and second lights are opposite to each other.

24. The method as claimed in claim 23,
wherein said second modulating step includes modulating the light power of said second light so that the light power of said second light changes between a third level lower than said first level and a fourth level lower than said third level, each of said third level and said fourth level being a low level of power which cannot change the state of said recording thin film from the amorphous state to the crystalline state without projecting said first light onto said optical recording medium.

* * * * *